US010726363B2

(12) United States Patent
Gomes

(10) Patent No.: US 10,726,363 B2
(45) Date of Patent: Jul. 28, 2020

(54) TICKET EVENT MODIFICATION FOR A PROBLEM TRACKING SYSTEM TICKET

(71) Applicant: INTERNATIONAL BUSINESS MACHINES CORPORATION, Armonk, NY (US)

(72) Inventor: Louis P. Gomes, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 403 days.

(21) Appl. No.: 15/184,202

(22) Filed: Jun. 16, 2016

(65) Prior Publication Data
US 2017/0364840 A1    Dec. 21, 2017

(51) Int. Cl.
*G06Q 10/06*    (2012.01)
*G06F 11/36*    (2006.01)

(52) U.S. Cl.
CPC ........... *G06Q 10/06* (2013.01); *G06F 11/362* (2013.01)

(58) Field of Classification Search
CPC .............................. G06Q 10/06; G06F 11/362
See application file for complete search history.

(56) References Cited

U.S. PATENT DOCUMENTS

| | | | | |
|---|---|---|---|---|
| 2004/0044554 A1* | 3/2004 | Bull | ....................... | G06Q 10/06 705/7.19 |
| 2004/0229730 A1* | 11/2004 | Ainsworth | ............. | A63B 24/00 482/8 |
| 2005/0060217 A1* | 3/2005 | Douglas | ................. | G06Q 10/06 705/7.14 |
| 2005/0060401 A1* | 3/2005 | Brown | .................. | H04L 63/083 709/224 |
| 2006/0253740 A1* | 11/2006 | Ritz | ..................... | G06F 11/0769 714/38.13 |
| 2007/0294258 A1* | 12/2007 | Caldwell | ................ | G06Q 10/10 |
| 2008/0041945 A1 | 2/2008 | Williamson et al. | | |
| 2009/0138854 A1* | 5/2009 | Mani | ................... | G06F 11/3664 717/124 |

(Continued)

FOREIGN PATENT DOCUMENTS

| | | |
|---|---|---|
| GB | 1571121 A | 7/1980 |
| WO | 2007064939 A2 | 6/2007 |

OTHER PUBLICATIONS

Altintas, Mucahit, et al; "Machine Learning Based Ticket Classification in Issue Tracking Systems." Proceeding of the International Conference on A.I. & Computer Science (AICS 2014). Sep. 15-16, 2014., pp. 195-207.

*Primary Examiner* — Sujay Koneru
(74) *Attorney, Agent, or Firm* — Cantor Colburn LLP; Teddi Maranzano

(57) ABSTRACT

Examples of techniques for ticket event modification for a ticket for a problem tracking system are disclosed. In one example implementation according to aspects of the present disclosure, a computer-implemented method may include: generating the ticket, the ticket comprising a ticket event; presenting the ticket comprising the ticket event to a user on a display; responsive to receiving a request from the user to modify the ticket event, modifying the ticket event while preserving an unmodified ticket event; and presenting the ticket comprising the modified ticket event to the user.

20 Claims, 10 Drawing Sheets

(56) References Cited

U.S. PATENT DOCUMENTS

| | | | |
|---|---|---|---|
| 2009/0259890 A1* | 10/2009 | Lund | H04L 41/069 714/35 |
| 2009/0327946 A1* | 12/2009 | Stignani | G06Q 10/10 715/776 |
| 2010/0057657 A1* | 3/2010 | Boothe | G06N 5/04 706/46 |
| 2010/0162389 A1* | 6/2010 | Burger | G06F 21/6218 726/21 |
| 2011/0022433 A1* | 1/2011 | Nielsen | G06Q 10/06 705/7.27 |
| 2011/0066559 A1* | 3/2011 | White | G06Q 10/00 705/304 |
| 2013/0046764 A1* | 2/2013 | Choi | G06Q 10/06 707/740 |
| 2013/0090976 A1* | 4/2013 | White | G06Q 10/20 705/7.27 |
| 2013/0263090 A1* | 10/2013 | Polk | G06F 11/3672 717/124 |
| 2014/0057700 A1 | 2/2014 | Czubak | |
| 2014/0215324 A1* | 7/2014 | Siegel | G06F 17/211 715/256 |
| 2014/0237304 A1* | 8/2014 | Lai | G06F 11/0742 714/57 |
| 2014/0359085 A1* | 12/2014 | Chen | H04L 41/0803 709/220 |
| 2015/0053757 A1 | 2/2015 | Williams et al. | |
| 2015/0199736 A1* | 7/2015 | Chang | G06Q 30/0601 705/26.1 |
| 2015/0288557 A1 | 10/2015 | Gates et al. | |
| 2016/0342927 A1* | 11/2016 | Reznik | G06Q 10/06 |
| 2017/0024088 A1* | 1/2017 | La Pean | H04W 4/90 |
| 2017/0220546 A1* | 8/2017 | Codrington | G06F 3/0484 |

* cited by examiner

2. Gomes, Louis P. Apr 8, 2015 5:20 PM

Hi Andrey, I sent the debug code to Franni. She will laod it for you so you may reproduce the problem using the failing seed to limit thw trace/ error output.

*FIG. 9*

TICKET EVENT MODIFICATION FOR A PROBLEM TRACKING SYSTEM TICKET

BACKGROUND

The present disclosure relates to a problem tracking system and more particularly to ticket event modification for a problem tracking system ticket.

A problem tracking system (PTS) is generally used during the test phase of a product, such as a software application or a hardware device. When a problem is found during testing, the problem is documented by a tester (i.e., a ticket owner or "TO") in the PTS, and PTS in turn generates a unique ticket number. The generated ticket is used to track the specific problem until a problem solution is released by the problem owner and verified by the tester.

A new ticket entry for a ticket may be created, such as when someone (i.e., a ticket entry owner or "TEO") adds a comment, updates the state of the ticket, appends output or fix, etc. The newly created ticket entry includes an identifier (i.e., a username, a number, etc.) of the PTS user that created the ticket entry (TE). By the time the problem is resolved, there may be many ticket entries, which may be appended by many users.

SUMMARY

According to examples of the present disclosure, techniques including methods, systems, and/or computer program products for ticket event modification for a ticket for a problem tracking system are provided. An example computer-implemented method may include: generating the ticket, the ticket comprising a ticket event; presenting the ticket comprising the ticket event to a user on a display; responsive to receiving a request from the user to modify the ticket event, modifying the ticket event while preserving an unmodified ticket event; and presenting the ticket comprising the modified ticket event to the user.

Additional features and advantages are realized through the techniques of the present disclosure. Other aspects are described in detail herein and are considered a part of the disclosure. For a better understanding of the present disclosure with the advantages and the features, refer to the following description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages thereof, are apparent from the following detailed description taken in conjunction with the accompanying drawings in which:

FIG. 9 illustrates a representation of comment entries of the problem tracking system ticket of FIG. 3 according to examples of the present disclosure.

DETAILED DESCRIPTION

During testing, many problems are identified by multiple testers. When a problem is identified, a tester creates a ticket, assigns a unique ticket number to the ticket, and assigns the ticket to a ticket owner (TO). In some cases, the tester detects the same (or similar) problem. To avoid excessive tickets (i.e., to reduce the ticket volume), the tester may append the existing ticket to include additional information by creating a new ticket event for the existing ticket.

If the new problem turns out to be a different problem, then the tester may create a new ticket for the new problem. The new ticket is assigned a new unique ticket number and is assigned to a TO. If this occurs, it may be difficult for someone to read through the multiple ticket and ticket events that describe same problems and determine which ticket corresponds to which problem. The present techniques solve these problems by simplifying the ticket and ticket event of problem tracking systems.

The present techniques provide clarity to a ticket reader of the problem tracking system by enabling tickets and ticket entries to be amended. In examples, only the TO (i.e., the one who has written up the problem) and the ticket entry owner (TEO) (i.e., the one who has appended a ticket entry, are allowed to modify that ticket entry.

Furthermore, the present techniques provide only a limited editing capability. For example, ticket entries, as well as the ticket entry text, are not deletable. Rather, ticket entries and/or ticket entry text may be indicated as "deleted" so that it may be disregarded by users and/or hidden from the users This enables the problem tracking system to preserve historical data. The deleted text may be hidden from the ticket reader. Also, to enhance the user viewing experience when using the ticket reader, multiple levels of details are provided to the reader and the reader can select the level of details to suit the user's needs.

In some implementations, the present techniques preserve ticket entry data while enabling a user to modify ticket entries. The present techniques also provide various views of tickets and corresponding ticket entries. These and other advantages will be apparent from the description that follows.

Figure 1:
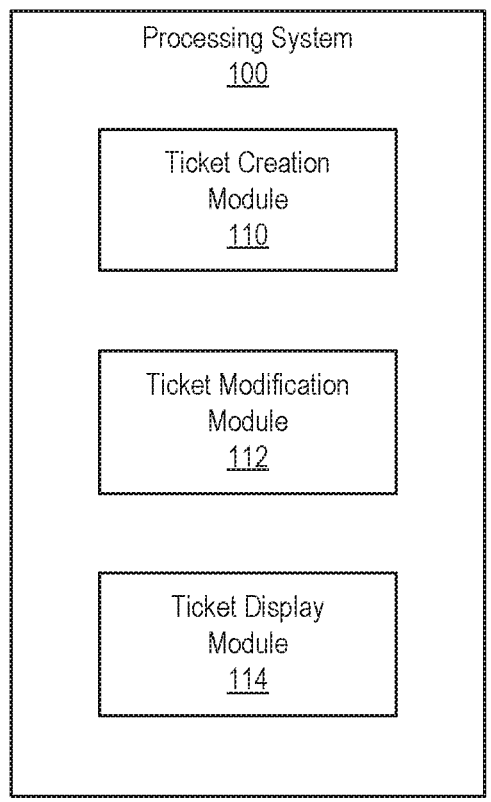
FIG. 1 illustrates a block diagram of a system for ticket event modification for a problem tracking system ticket according to examples of the present disclosure.

FIG. 1 illustrates a block diagram of a processing system 100 for ticket event modification for a problem tracking system ticket according to examples of the present disclosure. The various components, modules, engines, etc. described regarding FIG. 1 may be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. In examples, the engine(s) described herein may be a combination of hardware and programming. The programming may be processor executable instructions stored on a tangible memory, and the hardware may include a processing device (not shown) for executing those instructions. Thus a system memory (not shown) can store program instructions that when executed by the processing device implement the engines described herein. Other engines may also be utilized to include other features and functionality described in other examples herein.

Processing system 100 may include a ticket creation module 110, a ticket modification module 112, and a ticket display module 114. Alternatively or additionally, the processing system 100 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein.

The ticket creation module 110 enables a tester to create a ticket when a problem is detected. The problem may include detecting an error in a hardware device or in program instructions executable by a processing device. In the case of an error in a hardware device, the ticket relates to the detected error in the hardware device. Similarly, In the case of an error in program instructions, the ticket relates to the detected error in the program instructions.

If the tester detects a problem, the tester creates a ticket, which is assigned a unique ticket number. The tester may add a ticket entry that includes a description of the problem, a status (i.e., open) for the ticket, the ticket number, a time/date stamp, and/or other suitable information.

The ticket modification module 112 enables a user of the problem tracking system to modify a ticket and ticket events. Editing/modifying a ticket entry may be desirable to correct typographical errors or to provide updated information to provide better flow of information for the ticket readers. Generally, the ticket entries as well as the ticket entry text corresponding to the ticket entries cannot be deleted. This provides for the preservation of data for historical and review purposes.

Also, only a limited number of users may be enabled to edit/modify an existing ticket entry to preserve the original idea of the existing ticket entry. For example, only the ticket owner and the ticket entry owner are allowed to edit that ticket entry.

To preserve the original idea of the existing ticket entry, only a limited editing capability is provided to the TO and the TEO. Instead of actually deleting an existing ticket entry, the entire existing ticket entry may be designated as deleted, which is represented with strikethrough text. Certain letter(s), word(s), or phrase(s) of the existing ticket entry may also be "deleted" by use of strikethrough text. In some examples, the "deleted" text(s) and/or ticket entries may be highlighted to make them easy to identify by the reader.

In some examples, a limited number of characters or words (e.g., 20 characters, 4 words, etc.) may be inserted in any single place of the existing ticket entry. This provides for the correction of typographical errors and/or the adding of a few words to make statement more or less pronounced while preventing the user from significantly editing the ticket event. If the revision of the existing ticket entry requires more changes, then the user may "delete" the unwanted section of the existing ticket entry by use of strikethrough text and then append the ticket entry to include additional text, which may be shown in unformatted text or which may be highlighted, underlined, or otherwise identified as added.

Figure 6:
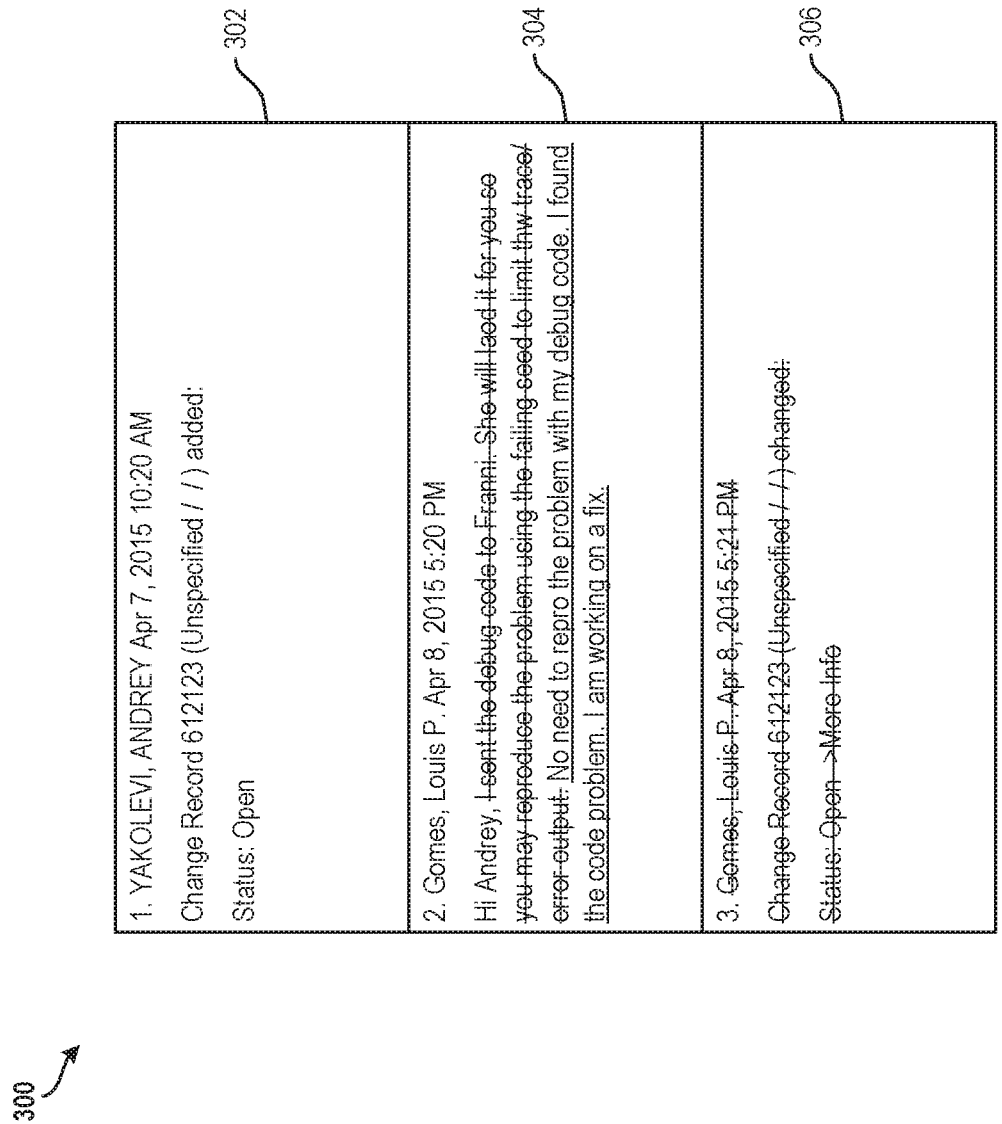
FIG. 6 illustrates a representation of the problem tracking system ticket of FIG. 3 with modified ticket events according to examples of the present disclosure.

The ticket display module 114 enables the ticket and corresponding ticket events to be displayed to a user of the problem tracking system. To enhance the user viewing experience, multiple levels of details may be provided to the user. In examples, the user can select the level of details to suit the user's needs by selecting various viewing options. A list of useful user selectable viewing may include the following:

Show all the text and entries of a ticket as illustrated in FIG. 6. This option would be useful for a user who is working on the particular ticket and wants to see all the details and history of the problem.

Figure 7:
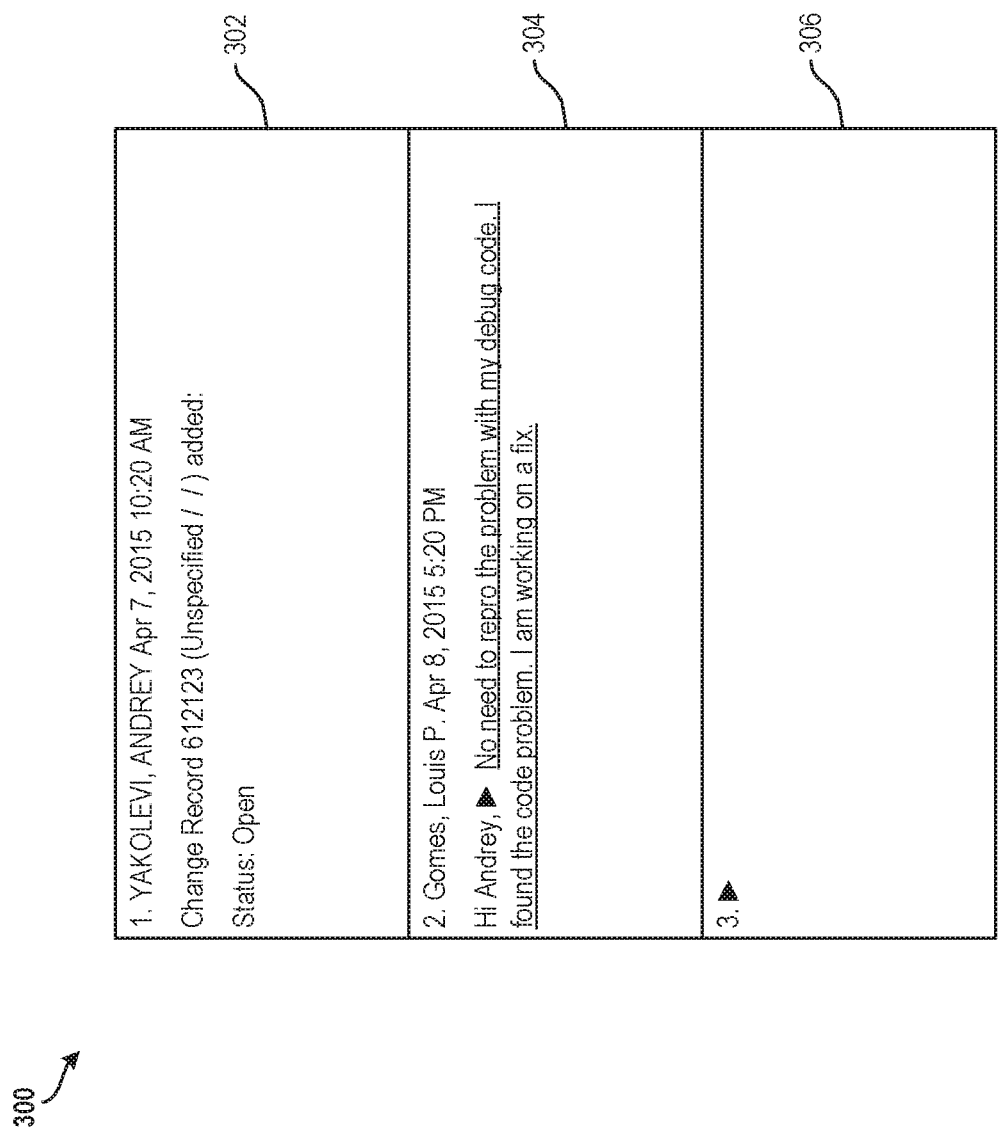
FIG. 7 illustrates a representation of the problem tracking system ticket of FIG. 3 with modified ticket events having hidden text according to examples of the present disclosure.

Show only the non-deleted texts and entries of a ticket as illustrated in FIG. 7. This option would be useful for a user who wants to see all the current details of a ticket but not irrelevant information. All the deleted text and entries are hidden in this view.

Figure 8:
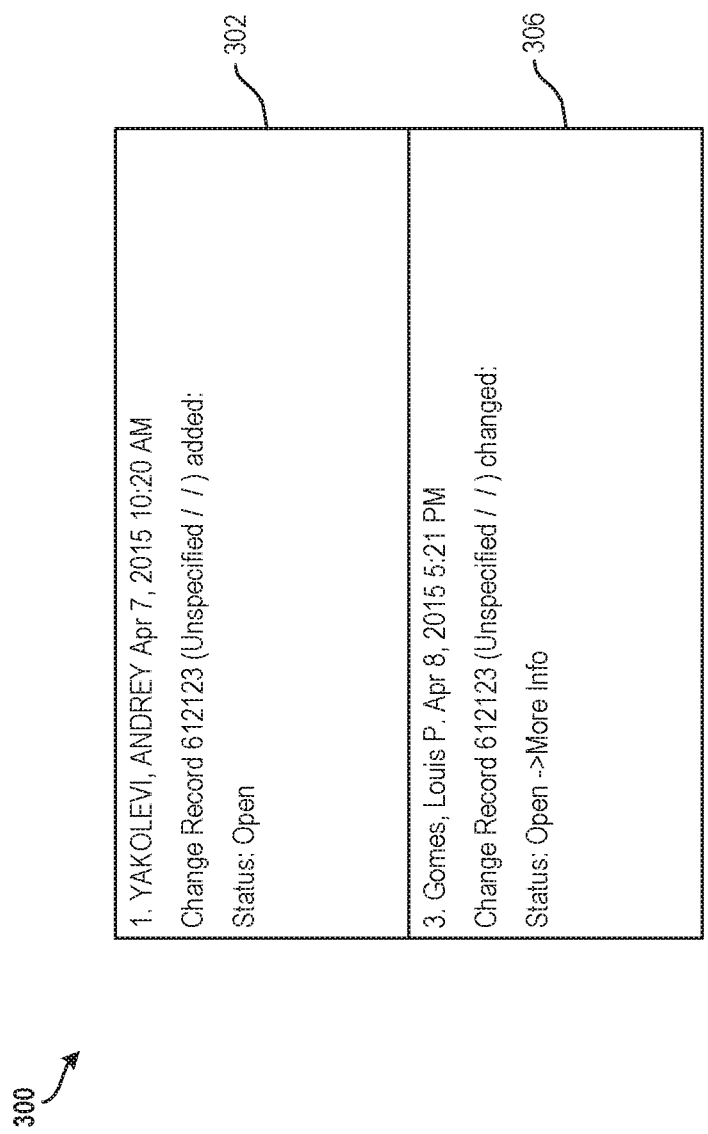
FIG. 8 illustrates a representation of state change entries of the problem tracking system ticket of FIG. 3 according to examples of the present disclosure.

Show only the state change entries of a ticket as illustrated in FIG. 8. The state change entries are entries that show the state change of a ticket as it goes through different states of the problem states from being open to the solved state. Some examples of states are: open, under investigation, need more information, reject, test private fix, private fix verified, finished, integrated, solved, etc.

Show only the comment entries of a ticket as illustrated in FIG. 9. This option would be useful for reading all the comments to either recreate the problem or to figure out the solution.

In examples, a default viewing option displays only the non-deleted text and entries of a ticket. In this view, once the edited ticket entry is submitted by the entry owner, the deleted text and/or entries from the modified ticket entry is hidden. This is illustrated in FIG. 7, for example.

Figure 2:
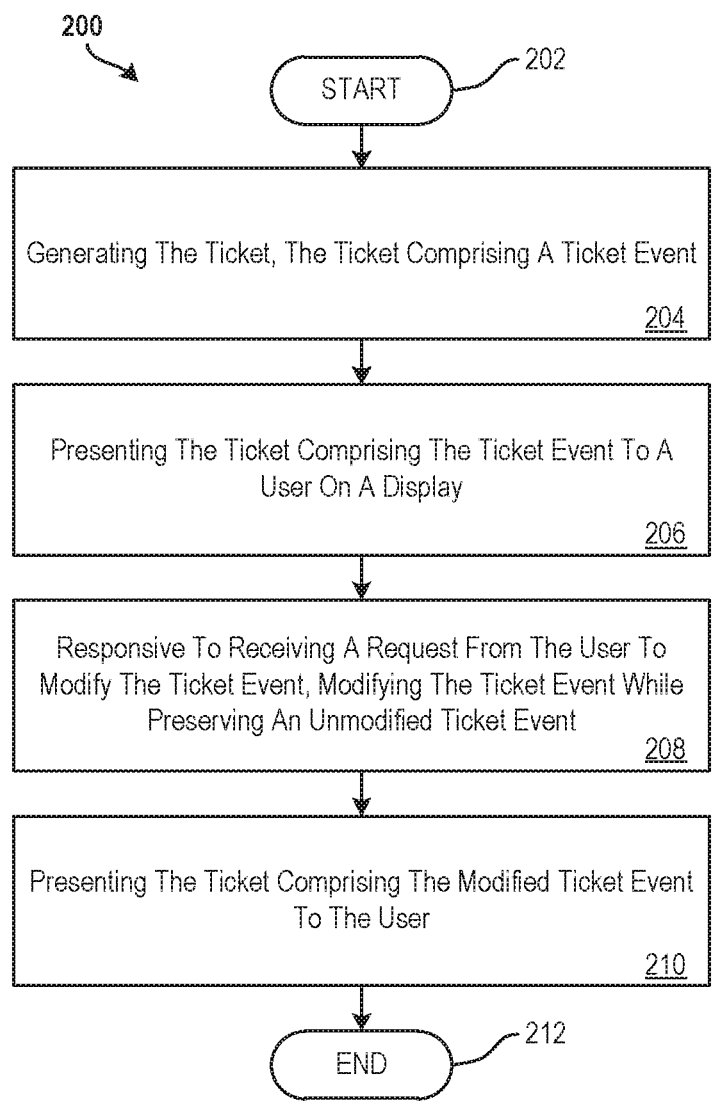
FIG. 2 illustrates a flow diagram of a computer-implemented method for ticket event modification for a ticket for a problem tracking system according to examples of the present disclosure.

FIG. 2 illustrates a flow diagram of a method 200 for ticket event modification for a ticket for a problem tracking system according to examples of the present disclosure. The method 200 may be a computer-implemented method performed by a processing system, such as the processing system 100 of FIG. 1, the processing system 20 of FIG. 10, and/or another suitable processing system. The method 200 starts at block 202 and continues to block 204.

At block 204, the method 200 includes generating the ticket. The ticket comprising a ticket event. In some examples, prior to generating the ticket, the method 200 may include detecting an error in a hardware device. In such cases, the ticket relates to the detected error in the hardware device. Similarly, the method 200 may include, prior to generating the ticket, detecting an error in program instructions executable by a processing device. In these cases, the ticket relates to the detected error in the program instructions.

At block 206, the method 200 includes presenting the ticket comprising the ticket event to a user on a display.

At block 208, the method 200 includes, responsive to receiving a request from the user to modify the ticket event, modifying the ticket event while preserving the unmodified ticket event. The request to modify the ticket may include a request to delete the ticket event or to modify a comment (e.g., add text, delete text, modify text, etc.) of a ticket event. According to aspects of the present disclosure, presenting the ticket comprising the modified ticket event to the user further comprises presenting the ticket comprising the unmodified ticket event to the user. When the modified ticket event is presented to the user, portions of the ticket event that were modified as deleted may appear in strike through or in another manner so as to distinguish the deleted portion from non-deleted portions. Similarly, any portions of the ticket event that were added may appear in another manner, such as underline or bold, to indicate that those portions were added.

In other examples, the unmodified ticket event is hidden from the user during the presenting the ticket comprising the modified ticket event from the user. According to aspects of the present disclosure, the unmodified ticket event may be presented to the user during the presenting the ticket comprising the modified ticket event responsive to the user requesting the unmodified ticket.

At block 210, the method 200 includes presenting the ticket comprising the modified ticket event to the user.

Additional processes also may be included. In other examples in which the ticket includes a plurality of ticket events, the method 200 may include applying a filter to the plurality of ticket events. The method 200 may also include presenting the ticket comprising the plurality of ticket events and the modified ticket event to the user based on the filter.

It should be understood that the processes depicted in FIG. 2 represent illustrations, and that other processes may be added or existing processes may be removed, modified, or rearranged without departing from the scope and spirit of the present disclosure.

Figure 3:
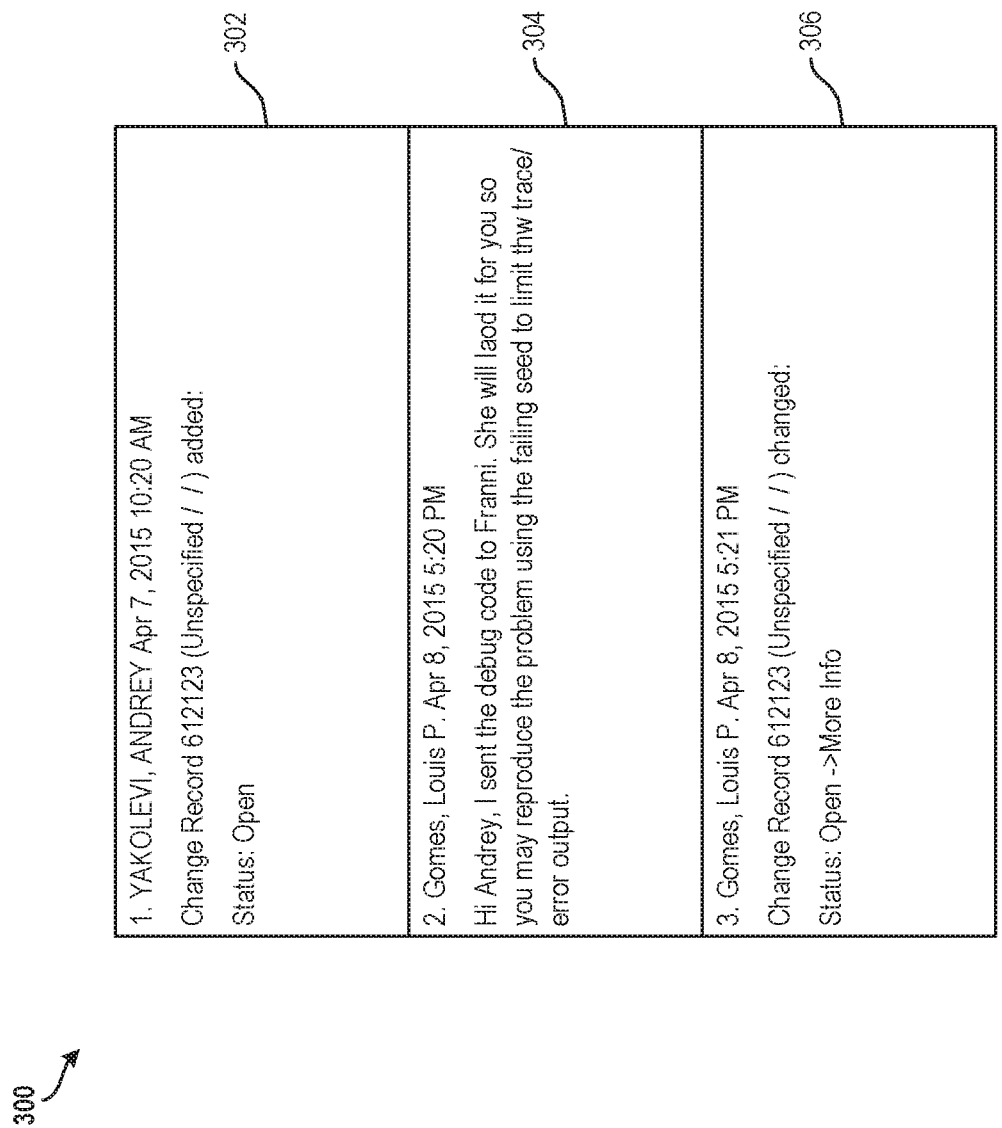
FIG. 3 illustrates a representation of a problem tracking system ticket with ticket events according to examples of the present disclosure.

FIG. 3 illustrates a representation of a problem tracking system ticket 300 with ticket events 302, 304, 306 according to examples of the present disclosure. Each of the ticket events 302, 304, 306 includes an identifier (e.g., name, identification number, etc.) of the ticket event owner, a time stamp, the unique ticket number (i.e., a change record), a status, and/or a comment. For example, the ticket event 302 represents a state change entry created by "Yakolevi, Andrea" on Apr. 7, 2015, at 10:20 AM, indicates a unique ticket number of 612123, and indicates a status of "Open."

The ticket event 304 represents a comment entry created by "Gomes, Louis P." on Apr. 8, 2015, at 5:20 PM. Ticket event 304 includes a comment as follows: "Hi Andrey, I sent the debug code to Franni. She will laod it for you so you may reproduce the problem using the failing seed to limit thw trace/error output."

The ticket event 306 represents a state change entry created by "Gomes, Louis P." on Apr. 8, 2015, at 5:21 PM, indicates the unique ticket number of 612123, and indicates a status of "Open→More Info."

Figure 4:
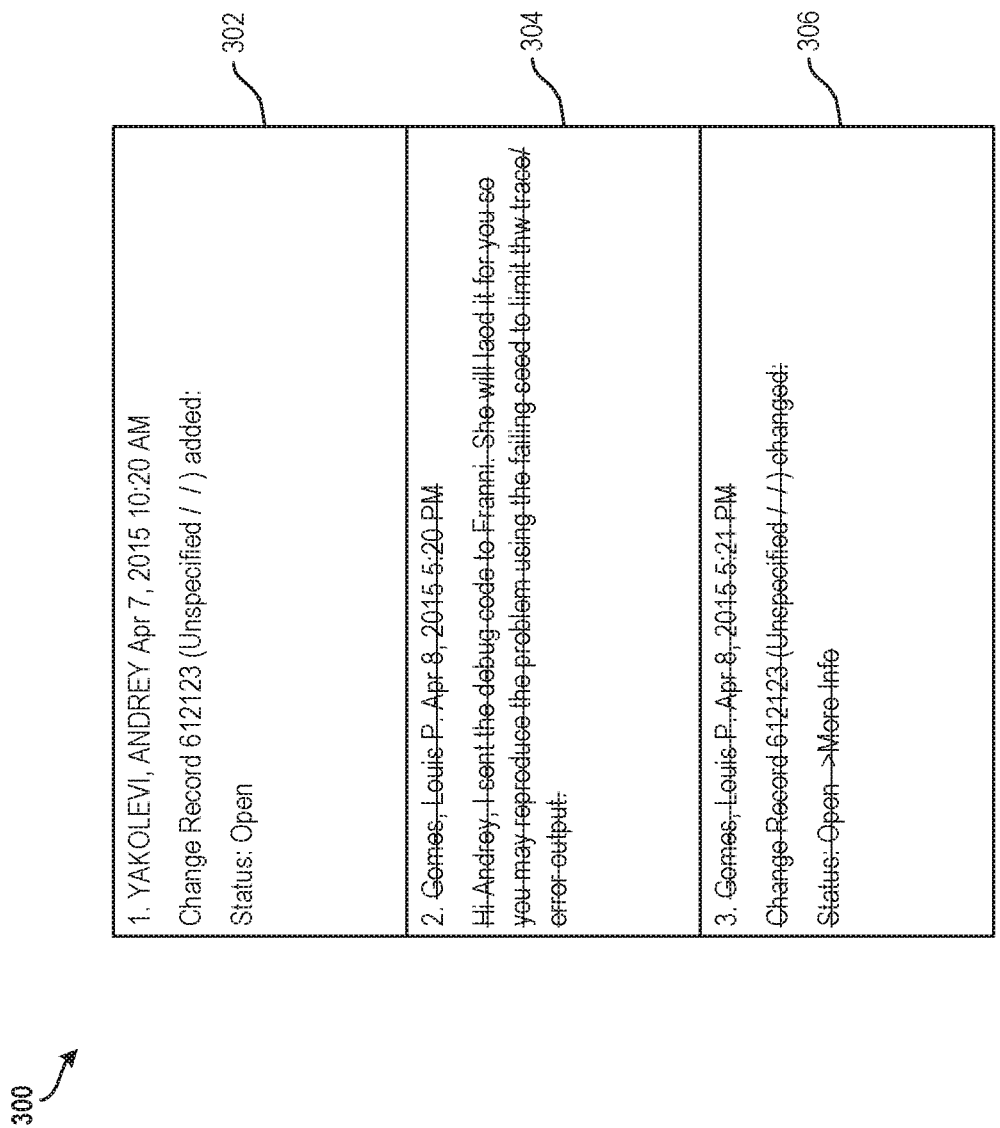
FIG. 4 illustrates a representation of the problem tracking system ticket of FIG. 3 with modified ticket events according to examples of the present disclosure.

FIG. 4 illustrates a representation of the problem tracking system ticket 300 of FIG. 3 with modified ticket events 304, 306 according to examples of the present disclosure. In this example, the ticket events 304 and 306 are selected (such as by a user) to be "deleted" as indicated by the strikethrough of the text. It should be appreciated that neither the text nor the ticket events 304 and 306 are actually deleted but rather are merely visually indicated as deleted. Rather, the text remains so that it may be viewed in the future, such as by the user or by other users.

Figure 5:
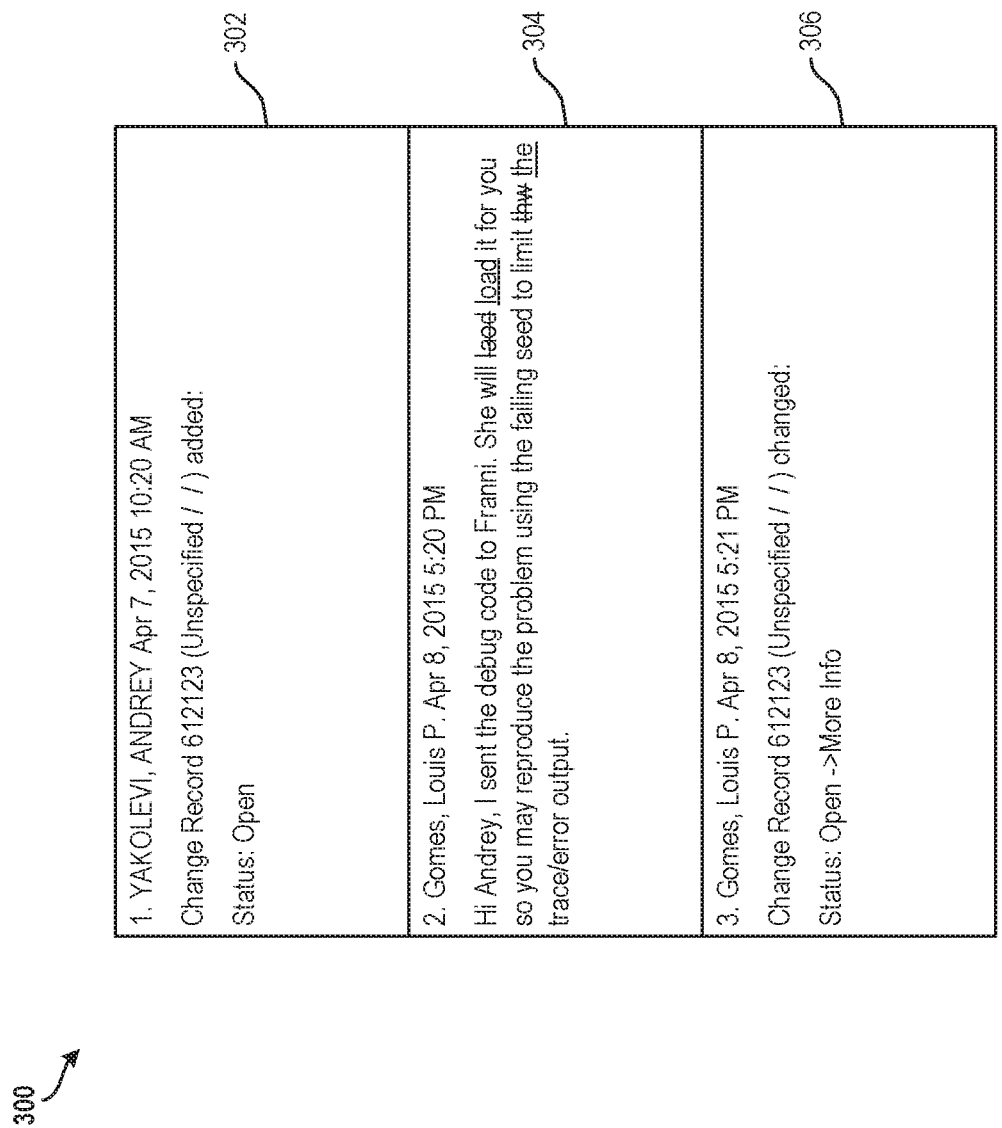
FIG. 5 illustrates a representation of the problem tracking system ticket of FIG. 3 with modified ticket events according to examples of the present disclosure.

FIG. 5 illustrates a representation of the problem tracking system ticket 300 of FIG. 3 with modified ticket events 304 according to examples of the present disclosure. In this example, two typographical errors are fixed (such as by a user). For example, the ticket event 304 is modified to correct typographical errors of "laod" and "thw" as illustrated. The misspelled text is "deleted" as indicated by the strikethrough of the text and new text ("load" and "the") is added as indicated by the underlining of the text. It should be appreciated that, although strikethrough is used to indicate deleted text and underlining is used to indicated added text, other indicia may be implemented in other examples. According to aspects of the present disclosure, such indicia may include font size, font face, font spacing, font color, background color, or other indicia.

FIG. 6 illustrates a representation of the problem tracking system ticket 300 of FIG. 3 with modified ticket events 304 and 306 according to examples of the present disclosure. The ticket event 304 is modified to "delete" text (indicated with strikethrough) and to add text (indicated with underlining). In this example, new information is available to the ticket event owner "Gomes, Louis P." who updates the ticket event 304. The new information may be a result of additional testing of the error that caused the ticket 300 to be created. In the present example, the added text indicates that the ticket event owner found the problem and is working on a fix. The ticket event owner also marks the ticket event 306 as "deleted" by striking through the text of the ticket event 306. Again, it should be appreciated that the text marked as "deleted" for the ticket events 304 and 306 is preserved and merely displays as deleted (i.e., displays with strikethrough of the text).

FIG. 7 illustrates a representation of the problem tracking system ticket of FIG. 3 with modified ticket events having hidden text according to examples of the present disclosure. In this example, the deleted portions of the ticket events 304 and 306 illustrated in FIG. 6 are hidden from the user as indicated by the arrows (▶). In examples, the arrows may be clickable by the user to expand the hidden text. In this case, the "deleted" text may be displayed with strikethrough as in FIG. 6.

According to aspects of the present disclosure, a user may desire to filter the ticket entries 302, 304, 306 of the ticket 300 based on state changes and/or comments. FIG. 8 illustrates a representation of state change entries of the problem tracking system ticket 300 of FIG. 3 according to examples of the present disclosure. In this example, the ticket entries 302 and 306, which indicate state changes, are displayed.

Similarly, FIG. 9 illustrates a representation of comment entries of the problem tracking system ticket of FIG. 3 according to examples of the present disclosure. In this example, the ticket entry 304, which includes comments, is displayed. It should be appreciated that a ticket entry may include a state change and/or a comment as well as additional information.

In aspects of the present disclosure, a user is also provided with the ability to combine multiple selectable viewing options from the list of viewing options to further customize the user's view. For example, the user may select to view only the undeleted texts (FIG. 7) as well as only comment entries (FIG. 9) by selecting both options.

Figure 10:
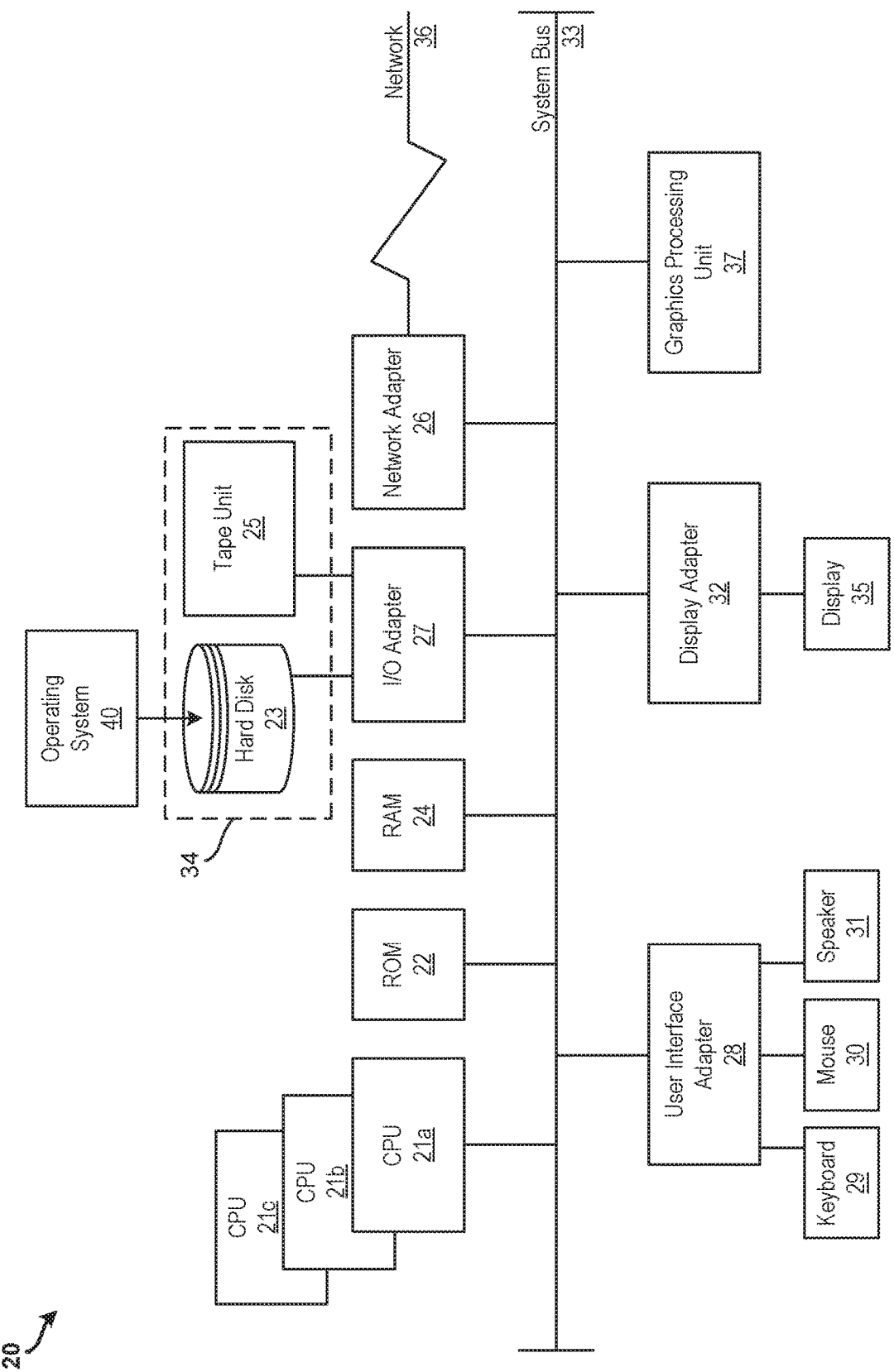
FIG. 10 illustrates a block diagram of a processing system for implementing the techniques described herein according to examples of the present disclosure.

It is understood in advance that the present disclosure is capable of being implemented in conjunction with any other type of computing environment now known or later developed. For example, FIG. 10 illustrates a block diagram of a processing system 20 for implementing the techniques described herein. In examples, processing system 20 has one or more central processing units (processors) 21a, 21b, 21c, etc. (collectively or generically referred to as processor(s) 21 and/or as processing device(s)). In aspects of the present disclosure, each processor 21 may include a reduced instruction set computer (RISC) microprocessor. Processors 21 are coupled to system memory (e.g., random access memory (RAM) 24) and various other components via a system bus 33. Read only memory (ROM) 22 is coupled to system bus 33 and may include a basic input/output system (BIOS), which controls certain basic functions of processing system 20.

Further illustrated are an input/output (I/O) adapter 27 and a communications adapter 26 coupled to system bus 33. I/O adapter 27 may be a small computer system interface (SCSI) adapter that communicates with a hard disk 23 and/or a tape storage drive 25 or any other similar component. I/O adapter 27, hard disk 23, and tape storage device 25 are collectively referred to herein as mass storage 34. Operating system 40 for execution on processing system 20 may be stored in mass storage 34. A network adapter 26 interconnects system bus 33 with an outside network 36 enabling processing system 20 to communicate with other such systems.

A display (e.g., a display monitor) 35 is connected to system bus 33 by display adaptor 32, which may include a graphics adapter to improve the performance of graphics intensive applications and a video controller. In one aspect of the present disclosure, adapters 26, 27, and/or 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 may be interconnected to system bus 33 via user interface adapter 28, which may include, for example, a Super I/O chip integrating multiple device adapters into a single integrated circuit.

In some aspects of the present disclosure, processing system 20 includes a graphics processing unit 37. Graphics processing unit 37 is a specialized electronic circuit designed to manipulate and alter memory to accelerate the creation of images in a frame buffer intended for output to a display. In general, graphics processing unit 37 is very efficient at manipulating computer graphics and image processing, and has a highly parallel structure that makes it more effective than general-purpose CPUs for algorithms where processing of large blocks of data is done in parallel.

Thus, as configured herein, processing system 20 includes processing capability in the form of processors 21, storage capability including system memory (e.g., RAM 24), and mass storage 34, input means such as keyboard 29 and mouse 30, and output capability including speaker 31 and display 35. In some aspects of the present disclosure, a portion of system memory (e.g., RAM 24) and mass storage 34 collectively store an operating system such as the AIX® operating system from IBM Corporation to coordinate the functions of the various components shown in processing system 20.

The present techniques may be implemented as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to aspects of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various examples of the present disclosure have been presented for purposes of illustration, but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

What is claimed is:

1. A computer-implemented method for ticket event modification for a ticket for a problem tracking system, the method comprising:
    providing a processing system comprising a ticket creation module, a ticket modification module, and a ticket display module;
    generating, by the ticket creation module, the ticket, the ticket comprising a ticket event, one or more ticket entries, and a ticket owner, wherein each of the one or more ticket entries comprise a ticket entry owner;
    presenting, by the ticket display module, the ticket comprising the ticket event to a first user on a user interface of a display;
    receiving a request from the first user to modify a ticket entry associated with the ticket event by adding a first portion to the ticket and deleting a second portion from the ticket;
    responsive to receiving the request from the first user to modify the ticket entry:
        determining that the first user is the ticket owner associated with the ticket entry;
        preserving a history of an unmodified ticket event;
        modifying the ticket to include the first portion, the first portion comprising a different font type, font color, or font size than an original portion of the ticket;
        modifying the ticket to remove the second portion; and
        modifying the ticket to include an arrow, wherein selection of the arrow causes the second portion to be displayed with strikethrough on the user interface;
    responsive to receiving a level of detail selection on the user interface, presenting the ticket comprising the modified ticket event to the first user, wherein the ticket is presented to the first user with the second portion being hidden front view;
    while the ticket is presented to the first user, causing the second portion to be non-hidden by displaying the second portion with strikethrough on the user interface in response to receiving a selection of the arrow by the first user;
    receiving a request from a second user to modify the ticket entry;
    responsive to determining that the second user is not the ticket owner or the ticket entry owner associated with the ticket entry, preventing modification of the ticket entry by the second user; and
    responsive to determining that the second user is the ticket entry owner associated with the ticket entry, modifying the ticket entry.

2. The computer-implemented method of claim 1, further comprising:
    prior to generating the ticket, detecting an error in a hardware device, wherein the ticket relates to the detected error in the hardware device.

3. The computer-implemented method of claim 1, further comprising:
    prior to generating the ticket, detecting an error in program instructions executable by a processing device, wherein the ticket relates to the detected error in the program instructions.

4. The computer-implemented method of claim 1, wherein presenting the ticket comprising the modified ticket event to the user further comprises presenting the ticket comprising the unmodified ticket event to the user.

5. The computer-implemented method of claim 1, wherein the unmodified ticket event is hidden from the user during the presenting the ticket comprising the modified ticket event from the user.

6. The computer-implemented method of claim 5, wherein the unmodified ticket event is presented to the user during the presenting the ticket comprising the modified ticket event responsive to the user requesting the unmodified ticket event.

7. The computer-implemented method of claim 1, wherein the ticket comprises a plurality of ticket events.

8. The computer-implemented method of claim 7, further comprising:
applying a filter to the plurality of ticket events; and
presenting the ticket comprising the plurality of ticket events and the modified ticket event to the user based on the filter.

9. The computer-implemented method of claim 1, wherein the request to modify the ticket comprises a request to delete the ticket event.

10. The computer-implemented method of claim 1, wherein the ticket event comprises a comment, and wherein the request to modify the ticket comprises a request to delete at least a portion of the comment from the ticket event.

11. The computer-implemented method of claim 10, wherein the deleted portion of the comment is presented to the user with strikethrough.

12. A system for ticket event modification for a ticket for a problem tracking system, the system comprising:
a processing system comprising a ticket creation module, a ticket modification module, and a ticket display module;
a memory having computer readable instructions; and
a processing device for executing the computer readable instructions, the computer readable instructions comprising:
generating, by the ticket creation module, the ticket, the ticket comprising a ticket event, one or more ticket entries, and a ticket owner, wherein each of the one or more ticket entries comprise a ticket entry owner;
presenting, by the ticket display module, the ticket comprising the ticket event to a first user on a user interface of a display;
receiving a request from the first user to modify a ticket entry associated with the ticket event by adding a first portion to the ticket and deleting a second portion from the ticket;
responsive to receiving the request from the first user to modify the ticket entry:
determining that the first user is the ticket owner associated with the ticket entry;
preserving a history of an unmodified ticket event;
modifying the ticket to include the first portion, the first portion comprising a different font type, font color, or font size than an original portion of the ticket;
modifying the ticket to remove the second portion; and
modifying the ticket to include an arrow, wherein selection of the arrow causes the second portion to be displayed with strikethrough on the user interface;
responsive to receiving a level of detail selection on the user interface, presenting the ticket comprising the modified ticket event to the first user, wherein the ticket is presented to the first user with the second portion being hidden from view;
while the ticket is presented to the first user causing the second portion to be non-hidden by displaying the second portion with strikethrough on the user interface in response to receiving a selection of the arrow by the first user;
receiving a request from a second user to modify the ticket entry;
responsive to determining that the second user is not the ticket owner or the ticket entry owner associated with the ticket entry, preventing modification of the ticket entry by the second user; and
responsive to determining that the third second user is the ticket entry owner associated with the ticket entry, modifying the ticket entry.

13. The system of claim 12, further comprising:
prior to generating the ticket, detecting an error in a hardware device, wherein the ticket relates to the detected error in the hardware device.

14. The system of claim 12, further comprising:
prior to generating the ticket, detecting an error in program instructions executable by a processing device, wherein the ticket relates to the detected error in the program instructions.

15. The system of claim 12, wherein presenting the ticket comprising the modified ticket event to the user further comprises presenting the ticket comprising the unmodified ticket event to the user.

16. The system of claim 12, wherein the unmodified ticket event is hidden from the user during the presenting the ticket comprising the modified ticket event from the user.

17. The system of claim 16, wherein the unmodified ticket event is presented to the user during the presenting the ticket comprising the modified ticket event responsive to the user requesting the unmodified ticket event.

18. The system of claim 12, wherein the ticket comprises a plurality of ticket events.

19. The system of claim 18, further comprising:
applying a filter to the plurality of ticket events; and
presenting the ticket comprising the plurality of ticket events and the modified ticket event to the user based on the filter.

20. A computer program product for ticket event modification for a ticket for a problem tracking system, the computer program product comprising:
a computer readable storage medium having program instructions embodied therewith, the program instructions executable by a processing device to cause the processing device to:
generate the ticket, the ticket comprising a ticket event, one or more ticket entries, and a ticket owner, wherein each of the one or more ticket entries comprise a ticket entry owner;
present the ticket comprising the ticket event to a first user on a user interface of a display;
receive a request from the first user to modify a ticket entry associated with the ticket event by adding a first portion to the ticket and deleting a second portion from the ticket;
responsive to receiving the request from the first user to modify the ticket entry:
determining that the first user is the ticket owner associated with the ticket entry;
preserving a history of an unmodified ticket event;
modifying the ticket to include the first portion, the first portion comprising a different font type, font color, or font size than an original portion of the ticket;
modifying the ticket to remove the second portion; and
modifying the ticket to include an arrow, wherein selection of the arrow causes the second portion to be displayed with strikethrough on the user interface;
responsive to receiving a level of detail selection on the user interface, present the ticket comprising the modified ticket event to the user, wherein the ticket is presented to the first user with the second portion hidden from view;

while the ticket is presented to the first user, causing the second portion to be non-hidden by displaying the second portion with strikethrough on the user interface in response to receiving a selection of the arrow by the first user;
receiving a request from a second user to modify the ticket entry;
responsive to determining that the second user is not the ticket owner or the ticket entry owner associated with the ticket entry, preventing modification of the ticket entry by the second user; and
responsive to determining that the second user is the ticket entry owner associated with the ticket entry, modifying the ticket entry.

\* \* \* \* \*